United States Patent
Meyer et al.

[11] Patent Number: 6,098,880
[45] Date of Patent: Aug. 8, 2000

[54] SHAPED MAGNETORESISTIVE READERS

[75] Inventors: Dallas W. Meyer, Burnsville; Jeffery K. Berkowitz, Carver; Michael B. Hintz, Mahtomedi; Edward M. Simpson, Minneapolis, all of Minn.

[73] Assignee: Seagate Technology, Inc., Scotts Valley, Calif.

[21] Appl. No.: 09/045,254

[22] Filed: Mar. 20, 1998

Related U.S. Application Data

[60] Provisional application No. 60/061,071, Oct. 3, 1997.

[51] Int. Cl.[7] ...................................................... G06K 7/08
[52] U.S. Cl. ......................... 235/449; 235/453; 360/110; 360/113
[58] Field of Search .................................. 235/449, 450, 235/451, 453, 459; 360/110, 113, 103

[56] References Cited

U.S. PATENT DOCUMENTS

| | | | |
|---|---|---|---|
| 5,155,643 | 10/1992 | Jones, Jr. et al. ........................ | 235/449 |
| 5,157,568 | 10/1992 | Katayama et al. ....................... | 360/113 |
| 5,546,254 | 8/1996 | Gill .......................................... | 360/113 |
| 5,644,228 | 7/1997 | Jeffers et al. ............................. | 235/449 |
| 5,669,133 | 9/1997 | George ...................................... | 29/603 |
| 5,821,517 | 10/1998 | Fedeli et al. ............................. | 235/449 |
| 5,828,528 | 10/1998 | Tolman et al. ........................... | 360/113 |
| 5,978,184 | 11/1999 | Terunuma ................................. | 360/113 |

*Primary Examiner*—Michael G Lee
*Assistant Examiner*—Daniel St. Cyr
*Attorney, Agent, or Firm*—Kinney & Lange, P.A.

[57] ABSTRACT

A magnetoresistive element has a height that extends from the air-bearing surface of a head. The height is determined by a slot in the head extending from the air-bearing surface adjacent the sensor portion at an acute angle to both the air bearing surface and the height of the magnetoresistive element to separate the magnetoresistive element into the sensor portion and a dormant portion. Alternatively, the height is determined by a recess of design depth in the magnetoresistive element at the air bearing surface. Alternatively, the height of the magnetoresistive element is determined by a stepped thickness to the first and second bias current carrying contacts along the height of the magnetoresistive element.

10 Claims, 3 Drawing Sheets

SHAPED MAGNETORESISTIVE READERS

CROSS-REFERENCE TO RELATED APPLICATION

This application claims priority from U.S. Provisional Application Ser. No. 60/061,071 filed Oct. 3, 1997 for "ABS Shaped Magnetoresistive Reader Design" by Dallas W. Meyer, Jeffery K. Berkowitz, Michael B. Hintz and Edward M. Simpson.

BACKGROUND OF THE INVENTION

This invention relates to magnetoresistive readers, and particularly to selectively fixing the height of magnetoresistive elements in magnetoresistive readers.

Magnetoresistive readers are employed on sliders in magnetic disc drives to read data from the adjacent rotating magnetic media. The slider usually includes rails defining air-bearing surfaces that define the flying characteristics of the slider. Air carried by the rotating disc generates air currents that react against the air-bearing surface causing the slider to aerodynamically fly a design distance from the disc. The trailing edge of the slider or rail ordinarily includes the head portion which may include a reader portion or a write portion, or both. Usually, the write portion comprises an inductive head employing a pair of magnetic poles separated by a gap, with a current-carrying coil arranged to create a magnetic field across the gap to write data into the media. A read head may also be included, one common form of read head being a magnetoresistive (MR) read head.

An MR read head comprises a magnetoresistive (MR) element having electrical contacts on opposite sides arranged to provide a bias current across the MR element. As the magnetic media rotates, the electrical resistance of the MR element is altered by the changing magnetic flux caused by the data moving past the MR element, thereby altering the voltage across the MR element. If a write head is employed on the slider, magnetic shields on each side of the MR element shield the MR element from the write head. Commonly, one of the shields may be a common pole to the write head.

The position of the MR element to the rotating media is important. The MR element must be close enough to the media to detect magnetic fluctuations due to data recorded thereon. However, if the MR element is too close to the media, the magnetic flux can alter the resistance of the MR element such that the bias current can overheat the MR element, leading to adverse results. It is important, therefore, that MR element be accurately positioned relative to the media to optimize the performance of the head. It is also important that the electrical height of the MR element be controlled to maintain the bias current density at a design level.

In a magnetic head, the "width" of the head is the dimension of the head across the track being written or read. In a write head, the "width" of the gap determines the width of the track being written, and hence the width of the head. Likewise, in an MR read head, the "width" of the MR element is the dimension across the width of the track. Usually the read head is smaller than the track width to reduce the likelihood of reading adjacent tracks simultaneously. Likewise, the "length" of the head is the distance across the gap or MR element along the track. The length and width of an element or gap, defines the area of the air-bearing surface occupied by the head sensor portion that confronts the magnetic media. The "height" of the sensor portion is the distance or extent of the MR element or gap into the head (from the air-bearing surface). The height of the MR element contributes to the current density, and hence the thermal characteristics of the head. If the height is too small, current density is increased (for a given bias current), causing the head to overheat. If the height is too large, current density is too small, resulting in lower amplitudes of voltage changes and more difficult signal detection. The present invention is directed to techniques for controlling the effective height of the MR element to accurately control the current density for the head.

BRIEF SUMMARY OF THE INVENTION

In a first aspect of the invention, a magnetoresistive head for reading data from a magnetic media comprises a magnetoresistive element that extends into the head from an air-bearing surface arranged to fly the head a design distance from the media moving relative to the head at a design velocity. The height of the magnetoresistive element is determined by a mechanism on the head.

In one form of the invention, a slot in the head extends through the magnetoresistive element to define the height of a sensor portion of the magnetoresistive element. Preferably, the slot extends from the air bearing surface adjacent the sensor portion at an acute angle to both the air bearing surface and the height of the magnetoresistive element to separate the magnetoresistive element into the sensor portion and a dormant portion.

In another form of the invention, a recess in the magnetoresistive element at the air-bearing surface determines the height of the magnetoresistive element. The recess has a design depth into the air bearing surface to define a selected height to the magnetoresistive element.

In yet another form of the invention, the height of the magnetoresistive element is determined by first and second bias current carrying contacts along the height of the magnetoresistive element. The first and second contacts each has a first thickness in the plane of the air bearing surface and a second thickness in a plane within the head parallel to the plane of the air bearing surface. The second thickness is greater than the first thickness to thereby carry a greater current density than the first thickness.

In a second aspect of the invention the height of a magnetoresistive element of a magnetic head is determined by selectively etching the head to define a current carrying region of the magnetoresistive element.

In one form of the second aspect of the invention, selectively etching the head comprises etching a slot in the head and through the magnetoresistive element to define the current carrying region of the magnetoresistive element having the design height from the air bearing surface. Preferably, the slot is selectively etched from the air bearing surface adjacent the current carrying region of the magnetoresistive element at an acute angle to both the air bearing surface and the magnetoresistive element to a depth in the head to separate the magnetoresistive element into the current carrying region and a dormant portion.

In another form of the second aspect of the invention, the selective etching of the head comprises etching a recess in the magnetoresistive element at the air bearing surface to a design depth into the air bearing surface to define a selected height of the current carrying region of the magnetoresistive element.

In another form of the second aspect of the invention, the head includes first and second contacts in contact with the magnetoresistive element along the initial height of the magnetoresistive element. The first and second contacts each has a first thickness and extends into the head from the plane of the air bearing surface. The selective etching of the head comprises etching a portion of the first and second contacts to a design depth from the plane of the air bearing surface to define a second, smaller thickness to the first and second contacts at the air bearing surface so that the regions of the first and second contacts having the first thickness carry a greater current density than the regions of the first and second contacts having the second thickness.

DETAILED DESCRIPTION

Figure 1:
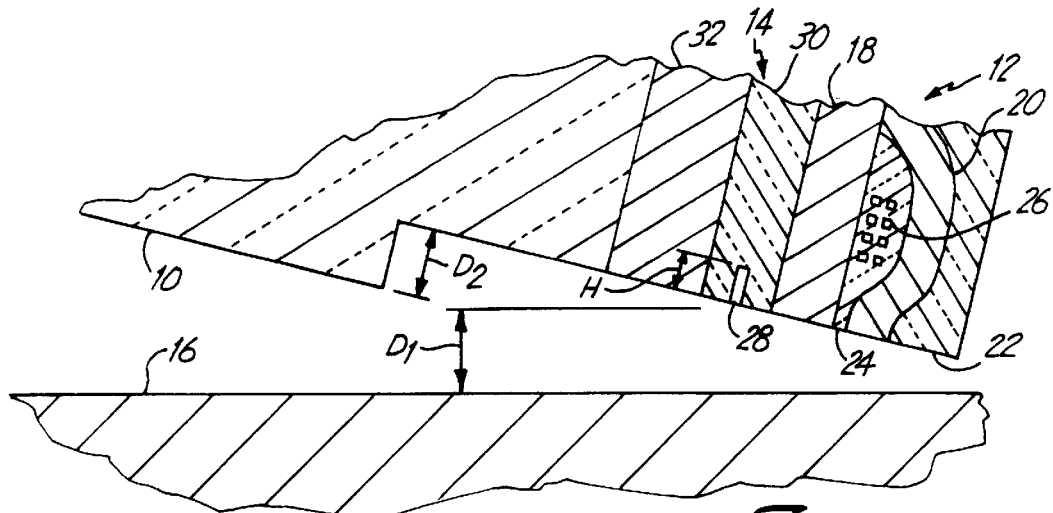
FIG. 1 is a section view of a write head and a read head of a prior art slider carrying in relation to a moving magnetic media.

FIG. 1 illustrates a prior art slider 10 having a write head 12 and a read head 14 arranged to confront a moving magnetic media, such as rotating magnetic disc 16. Write head 12 includes first and second poles 18 and 20 separated, at air-bearing surface 22, by a gap 24 of insulating material. Coil 26 carries a current to induce a magnetic field into media 16 adjacent gap 24, thereby writing data to the media. Read head 14 includes an MR element 28 having electrical contacts (not shown in FIG. 1) electrically connected to each side of element 28, to provide a bias current through the MR element across its width. Soft adjacent layers (SALs), biasing layers and other elements well known in the art contributing to the operation of MR element 28 may be included in head 14. A layer 30 of insulating material isolates MR element 28 from pole 18 and magnetic shield 32. In the embodiment illustrated in FIG. 1, pole 18 is a common pole providing a shield on the opposite side of MR element 28.

MR element 28 is arranged to fly a design distance $D_1$ from the surface of media 16. As previously explained, it is important that MR element 28 not fly too high, nor too low, from disc 16. To avoid flying too low to the media, it is common to provide a recession $D_2$ in the air-bearing surface, to raise the MR element. As shown particularly, in FIG. 1, MR element 28 has a height H extending from air-bearing surface 22 into the head, normal to the air-bearing surface 22. The present invention is directed to controlling the effective height of MR element 28.

Figure 2:
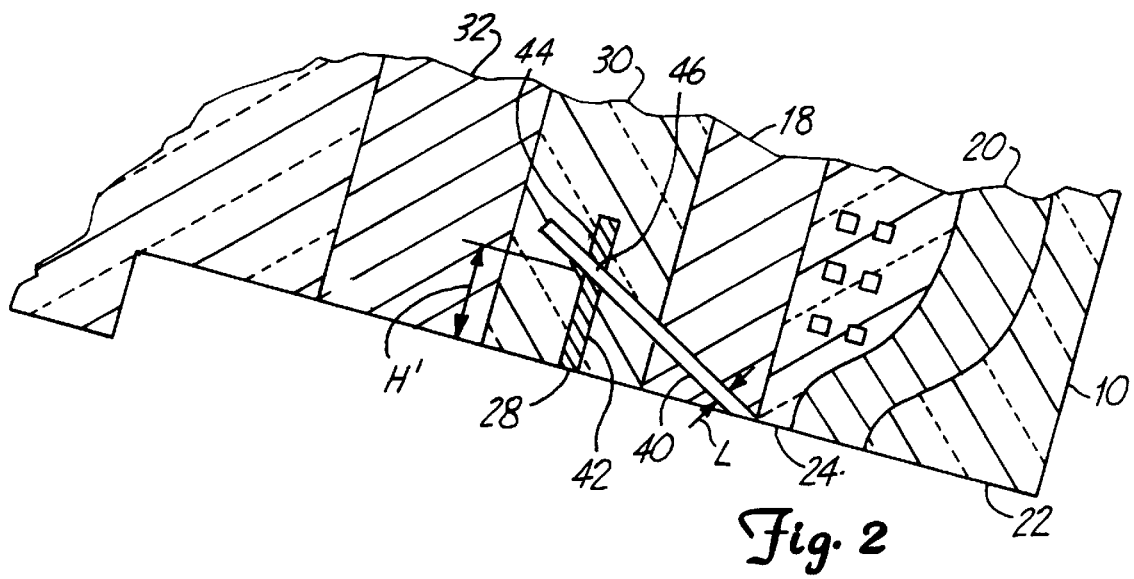
FIG. 2 is a section view, as in FIG. 1, of a slider having an MR read head in accordance with a first embodiment of the present invention.
Figure 3:
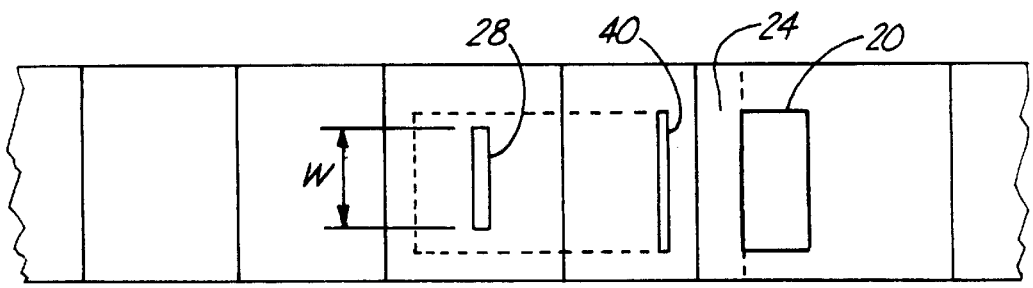
FIG. 3 is a view of the air-bearing surface of the head illustrated in FIG. 2.

FIGS. 2 and 3 illustrate a first embodiment of the present invention. As shown in FIG. 2, slider 10 is modified by the formation of slot 40 into the slider from air-bearing surface 22. MR element 28 has a height H up to 10% greater than the desired height for the head. Slot 40 extends at an acute angle to both air-bearing surface 22 and the height of MR element 28 to sever MR element 28 into a sensor portion 42 and a dormant portion 44. As shown particularly in FIG. 3, the width of slot 40 is greater than the width W of MR element 28 to ensure that the slot completely severs MR element 28 at point 46. As a result, the effective height of the sensor portion 42 of MR element 28 is H', which is the distance from air-bearing surface 22 to point 46 of severance. The length L of slot 40 (in the direction along the track) is preferably quite small, typically less than about 0.2 microns. Although slot 40 is shown as not extending into shield layer 32, it may be desirable in some cases to extend the slot into the shield layer to assure complete severance of MR element 28. Also, although the slot is illustrated as commencing at common pole 18 at the air-bearing surface and extending through MR element 28, slot 40 may extend at an acute angle from shield layer 32 through MR element 28, in which case it may or may not extend into common pole 18, as desired. Also, while slot 40 may be etched in any well-known manner, focused ion etching is most preferred since it provides greater control of the etching parameters.

In operation, bias current is applied to both the sensing portion 42 and dormant portion 44 of the MR element, forming parallel current paths between the contacts (not shown in FIGS. 2 and 3). However, the changing magnetic field due to data on the rotating media moving past the head, alters the resistance of the sensing portion 42, due to its proximity to the media, but not the dormant portion. Since the height of dormant portion 44 represents at less than 10% of the overall height H of the MR element 28 and the dormant portion is not affected by the magnetic flux from the media, the dormant portion represents a high resistance parallel to sensing portion 42. Consequently, dormant portion 44 does not materially affect the signal output from the MR element. Hence, slot 40 effectively controls the effective height of the MR element and the current density within the sensing region 42.

Figure 4:
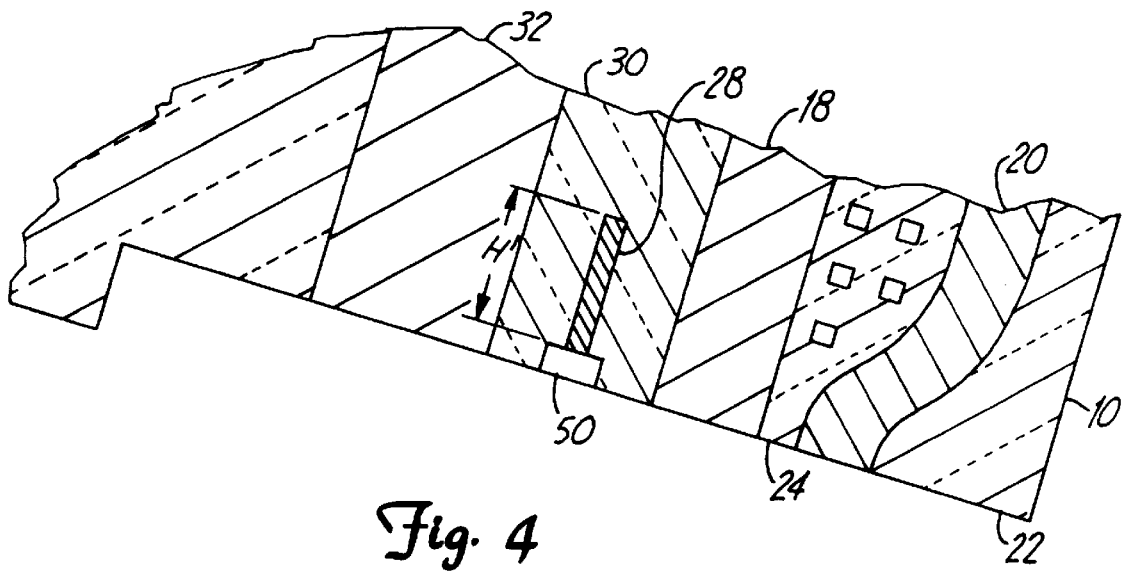
FIG. 4 is a section view, as in FIG. 2, of a portion of a slider having an read MR head in accordance with a second embodiment of the present invention.

FIG. 4 illustrates a second embodiment of the present invention by which a recess 50 is etched into the air-bearing surface 22 at MR element 28 to remove a portion of MR element 28, thereby altering the effective height of the MR element to a design height H'. Recess 50 effectively concentrates the current density to a design level through the MR element, thereby closely regulating the effective height of the element.

Figure 5:
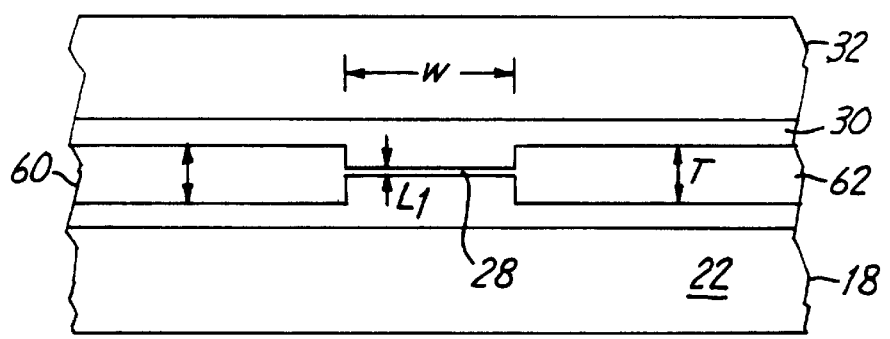
FIGS. 5 and 6 are views from the air-bearing surface.
Figure 6:
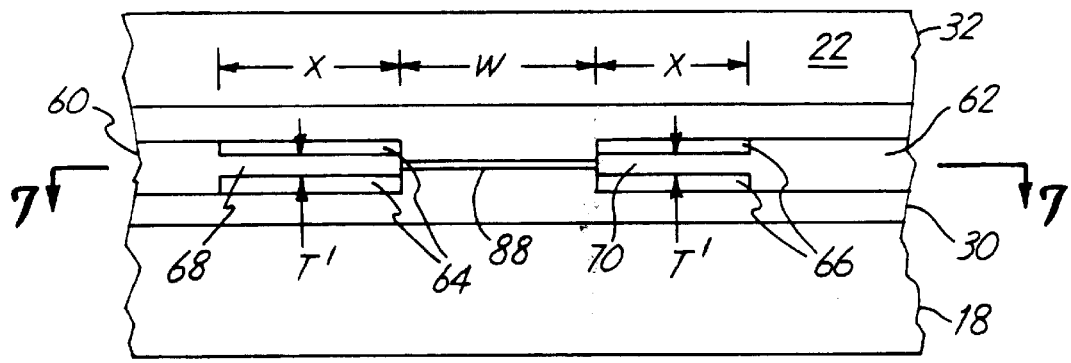
Figure 7:
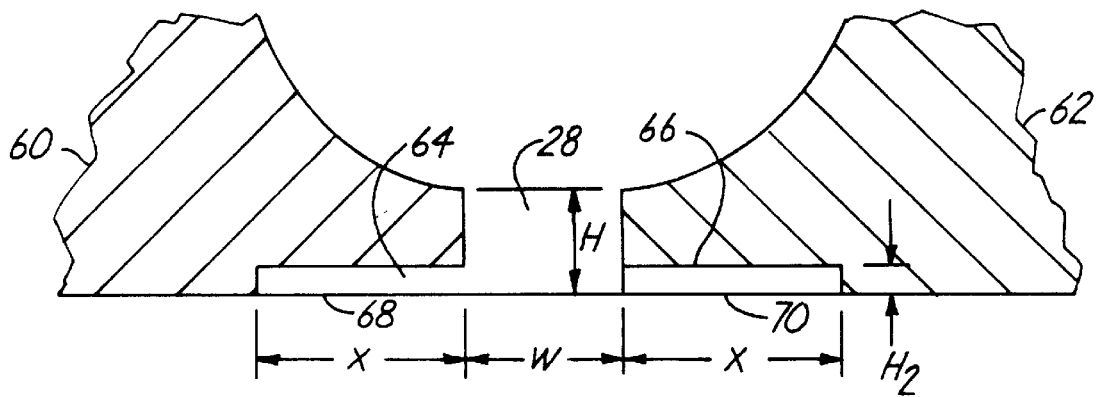
FIG. 7 is a section view taken at line 7—7 of FIG. 6, illustrating the fabrication of an MR read head in accordance with a third embodiment of the present invention.

FIGS. 5–7 illustrate a third embodiment of the present invention. FIG. 5 illustrates the read portion of slider 10 having MR element 28 at the air-bearing surface with adjacent contacts 60 and 62 contacting the edges of MR element 28 on opposite sides of its width W. Typically, the length $L_1$ of MR element 28 is of the order of about 150 Angstroms, although reader lengths of up to 500 Angstroms are common. The width W of MR element 28 is typically between about 0.5 and 2 microns and the height H is between about 1.5 and 4.0 microns. Contacts 60 and 62 typically have a length T (in the direction of the length $L_1$ of MR element 28) between about 2,000 and 6,000 Angstroms (0.2 to 0.6 microns).

The height of MR element 28 is shaped and determined by etching recesses 64 into contact 60 and recesses 66 into each side of contact 62, at the air-bearing surface, thereby forming narrow portions 68 and 70 at the air-bearing surface of contacts 60 and 62, respectively. Preferably, each recess 64 and 66 comprises approximately one-third the length T of the original contacts 60 and 62, leaving the narrow portions 68 and 70 having a length T' also about one-third the original length T of contact 60, 62. Consequently, the length of narrowed portions 68 and 70 are between 600 and 2000 angstroms (0.06 and 0.2 microns), depending upon the original length T of contact 60 and 62. Preferably, the width X of each reduced portion 68 and 70 of contacts 60 and 62 is significantly greater than the width W of MR element 28.

For example, where the MR element has a width W between about 0.5 and 2 microns, the width X of reduced portions 68 and 70 of contacts 60 and 62 is between about 8 and 15 microns. The depth $H_2$ (FIG. 7) of each recess 64 and 66 defines the effective height $H_1$ of MR element 28. Typically, the depth $H_2$ will be about 200–1000 angstroms.

The effect of trimming the contacts as described in connection with FIGS. 5–7 is to reduce the effective height H of MR element 28. More particularly, current flowing through contacts 60 and 62 will concentrate in the regions of greater thickness of the contacts, thereby entering the MR element 28 in the region of effective height H1. Consequently, current density in the MR element is controlled by controlling the height of the contacts. The responsiveness of the MR element to changing magnetic fields due to data in the adjacent recording media is not affected because the MR element is entirely affected by the flux from the data passing the element. Consequently, trimming the contacts as described in connection with FIGS. 5–7 effectively adjusts the height of the MR element to control responsiveness of it.

Although the present invention has been described with reference to preferred embodiments, workers skilled in the art will recognize that changes may be made in form and detail without departing from the spirit and scope of the invention.

What is claimed is:

1. A magnetoresistive head for reading data from a magnetic media comprising: a magnetoresistive element extending into the head from an air bearing surface of the head, the air bearing surface being arranged to fly the head a design distance from the media moving relative to the head at a design velocity; and a selectively-etched recess extending from the air bearing surface into the magnetoresistive head for determining a design height of the magnetoresistive element, wherein the magnetoresistive element extends into the head a design extent from the air bearing surface and the selectively-etched recess comprises a recess in the magnetoresistive element extending from the air bearing surface into the head, the recess having a design depth into the air bearing surface to define a selected height to the magnetoresistive element between the extent of the magnetoresistive element and the recess.

2. A process of determining a design height of a magnetoresistive element of a magnetic head comprising: forming the magnetic head comprising an air bearing surface arranged to fly the head a design distance from a magnetic media moving relative to the head at a design velocity and a magnetoresistive element having an initial height greater than the design height; and selectively etching a recess extending from the air bearing surface into the head to define a current carrying sensor portion of the magnetoresistive element, wherein the magnetoresistive element extends into the head from the air bearing surface by a design extent, and the step of selectively etching the head comprises etching a recess in the magnetoresistive element extending from the air bearing surface to a design depth into the air bearing surface to define a selected height of the current carrying region of the magnetoresistive element between the extent of the magnetoresistive element and the recess.

3. A magnetoresistive head for reading data from a magnetic media comprising:

a magnetoresistive element extending into the head from an air bearing surface of the head, the air bearing surface being arranged to fly the head a design distance from the media moving relative to the head at a design velocity; and a selectively-etched slot in the head extending through the magnetoresistive element to define a sensor portion of the magnetoresistive element having a selected height from the air bearing surface.

4. The magnetoresistive head of claim 3, wherein the magnetoresistive element extends essentially normal to the air bearing surface and the slot extends from the air bearing surface adjacent the sensor portion of the magnetoresistive element at an acute angle to both the air bearing surface and the height of the magnetoresistive element to separate the magnetoresistive element into the sensor portion and a dormant portion.

5. The magnetoresistive head of claim 4, wherein the dormant portion represents less than 10% of a combined extent of the sensor portion and the dormant portion.

6. A magnetoresistive head for reading data from a magnetic media comprising:

a magnetoresistive element extending into the head from an air bearing surface of the head, the air bearing surface being arranged to fly the head a design distance from the media moving relative to the head at a design velocity; and first and second contacts in contact with opposite sides of the magnetoresistive element along the height of the magnetoresistive element, the first and second contacts each having a first thickness adjacent the sides of the magnetoresistive element in the plane of the air bearing surface and a second thickness adjacent the sides of the magnetoresistive element in a plane within the head parallel to the plane of the air bearing surface, the second thickness being greater than the first thickness to thereby carry a greater current density than the first thickness, the first and second contacts transitioning between the first and second thicknesses at a selected depth from the air bearing surface to determine the height of the magnetoresistive element.

7. A process of determining a design height of a magnetoresistive element of a magnetic head comprising:

forming the magnetic head having an air bearing surface to fly the head a design distance from a magnetic media moving relative to the head at a design velocity, the magnetic head having a magnetoresistive element extending into the head from the air bearing surface and having an initial height greater than the design height; and selectively etching a slot in the head and through the magnetoresistive element to define the current carrying region of the magnetoresistive element having the design height from the air bearing surface.

8. The process of claim 7, wherein the magnetoresistive element extends essentially normal to the air bearing surface and the selectively-etching of the slot comprises etching from the air bearing surface adjacent the current carrying region of the magnetoresistive element at an acute angle to both the air bearing surface and the magnetoresistive element to a depth in the head to separate the magnetoresistive element into the current carrying sensor portion and a dormant portion.

9. The process of claim 8, wherein the dormant portion represents less than 10% of a combined extent of the sensor portion and the dormant portion.

10. A process of determining a design height of a magnetoresistive element of a magnetic head comprising:

forming the magnetic head having an air bearing surface to fly the head a design distance from a magnetic media moving relative to the head at a design velocity, the magnetic head having a magnetoresistive element extending into the head from the air bearing surface and having an initial height greater than the design height, the magnetic head further including first and second contacts in contact with opposite sides of the magnetoresistive element along the initial height of the magnetoresistive element, the first and second contacts each having a first thickness adjacent the sides of the magnetoresistive element and extending into the head from the plane of the air bearing surface; and selectively etching the first and second contacts to a design depth from the plane of the air bearing surface to define a second thickness of the first and second contacts adjacent the sides of the magnetoresistive element at the air bearing surface, the second thickness being smaller than the first thickness so that the regions of the first and second contacts having the first thickness carry a greater current density than the regions of the first and second contacts having the second thickness.

* * * * *